US010917935B2

(12) United States Patent
Kiss et al.

(10) Patent No.: US 10,917,935 B2
(45) Date of Patent: *Feb. 9, 2021

(54) EMERGENCY SERVICES SUPPORT FOR NON-CELLULAR WIRELESS ACCESS

(71) Applicant: Apple Inc., Cupertino, CA (US)

(72) Inventors: Krisztian Kiss, Hayward, CA (US); Rohan C. Malthankar, San Jose, CA (US); Rafael L. Rivera-Barreto, Santa Clara, CA (US); Vikram Bhaskara Yerrabommanahalli, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,354

(22) Filed: Aug. 20, 2018

(65) Prior Publication Data

US 2019/0069338 A1 Feb. 28, 2019

Related U.S. Application Data

(63) Continuation of application No. 15/596,316, filed on May 16, 2017, now Pat. No. 10,057,927.
(Continued)

(51) Int. Cl.
*H04W 76/50* (2018.01)
*H04W 4/90* (2018.01)
(Continued)

(52) U.S. Cl.
CPC ......... *H04W 76/50* (2018.02); *H04L 61/1511* (2013.01); *H04L 61/304* (2013.01);
(Continued)

(58) Field of Classification Search
None
See application file for complete search history.

(56) References Cited

U.S. PATENT DOCUMENTS 9,538,351 B1 * 1/2017 Chen .................. H04W 4/90
2006/0072517 A1 4/2006 Barrow et al.
(Continued)

FOREIGN PATENT DOCUMENTS

CN 101466083 A 6/2009
CN 101601241 A 12/2009
(Continued)

OTHER PUBLICATIONS

ETSI TS 123 003 V12.8.0 (Oct. 2015), Digital cellular telecommunications system (Phase 2+); Universal Mobile Telecommunications System (UMTS); Numbering, addressing and identification (3GP TS 23.003 version 12.8.0 Release 12), Oct. 2015, 94 pages.
(Continued)

*Primary Examiner* — Ajit Patel
(74) *Attorney, Agent, or Firm* — Dickinson Wright RLLP

(57) ABSTRACT

Apparatus and methods to support emergency services sessions by network elements and by a wireless device are disclosed. The wireless device, when roaming to a visited country/region, queries a network-based server to obtain information for Public Land Mobile Networks (PLMNs) that support emergency services sessions via non-cellular wireless access in the visited country/region. The network-based server responds with a list of PLMNs from which the wireless device selects a PLMN. The wireless device further queries the network-based server to obtain information for evolved Packet Data Gateways (ePDGs) for a selected PLMN and receives from the network-based server a list of Internet Protocol (IP) addresses for ePDGs that support emergency services sessions via non-cellular wireless access for the selected PLMN. The wireless device further queries the network-based server for local numbers of the visited country for establishing emergency services sessions and
(Continued)

receives a categorized list of local numbers for emergency services.

20 Claims, 8 Drawing Sheets

Related U.S. Application Data

(60) Provisional application No. 62/337,154, filed on May 16, 2016.

(51) Int. Cl.
| | | |
|---|---|---|
| *H04L 29/12* | (2006.01) | |
| *H04W 8/12* | (2009.01) | |
| *H04W 48/16* | (2009.01) | |
| *H04W 88/06* | (2009.01) | |
| *H04W 88/16* | (2009.01) | |

(52) U.S. Cl.
CPC ............. *H04W 4/90* (2018.02); *H04L 61/605* (2013.01); *H04W 8/12* (2013.01); *H04W 48/16* (2013.01); *H04W 88/06* (2013.01); *H04W 88/16* (2013.01)

(56) References Cited

U.S. PATENT DOCUMENTS

| | | |
|---|---|---|
| 2006/0077965 A1 | 4/2006 | Garcia-Martin et al. |
| 2008/0076420 A1 | 3/2008 | Khetawat et al. |
| 2010/0255808 A1 | 10/2010 | Guo et al. |
| 2010/0273445 A1 | 10/2010 | Dunn et al. |
| 2012/0231760 A1 | 9/2012 | Zhu et al. |
| 2012/0322412 A1 | 12/2012 | Qiang |
| 2014/0241330 A1 | 8/2014 | Thanigaivel |
| 2015/0072639 A1 | 3/2015 | Zhang et al. |
| 2015/0296359 A1 | 10/2015 | Edge |
| 2015/0350983 A1 | 12/2015 | Kwok et al. |
| 2016/0183156 A1* | 6/2016 | Chin ................. H04W 36/0022 370/331 |
| 2016/0295386 A1 | 10/2016 | Faccin et al. |
| 2016/0366574 A1* | 12/2016 | Dahan ..................... H04W 4/90 |
| 2017/0005914 A1 | 1/2017 | Edge et al. |
| 2017/0135031 A1 | 5/2017 | Buckley et al. |
| 2017/0156043 A1* | 6/2017 | Li ........................... H04W 4/90 |
| 2017/0332416 A1 | 11/2017 | Kiss et al. |
| 2018/0139692 A1* | 5/2018 | Liu ....................... H04W 48/18 |

FOREIGN PATENT DOCUMENTS

| | | |
|---|---|---|
| CN | 101945365 A | 1/2011 |
| JP | 2005020109 A * | 6/2003 |
| WO | 2015184415 A1 | 5/2015 |

OTHER PUBLICATIONS

ETSI TS 124 008 V12.12.0 (Jan. 2016), Digital cellular telecommunications system (Phase 2+); Universal Mobile Telecommunications System (UMTS); LTE; Mobile radio interface Layer 3 specification; Core network protocols; Stage 3 (3GPP TS 24.008 version 12.12.0 Release 12), Jan. 2016, 710 pages.

International Patent Application No. PCTIUS2017/032926—International Search Report and Writtern Opinion dated Aug. 24, 2017.

Chinese Patent Application No. 201780030283.6—First Office Action dated Jun. 28, 2020.

* cited by examiner

EMERGENCY SERVICES SUPPORT FOR NON-CELLULAR WIRELESS ACCESS

CROSS-REFERENCE TO RELATED APPLICATIONS

This Application is a continuation of U.S. patent application Ser. No. 15/596,316, filed May 16, 2017, entitled "EMERGENCY SERVICES SUPPORT FOR NON-CELLULAR WIRELESS ACCESS," issued as U.S. Pat. No. 10,057,927, which claims the benefit of U.S. Provisional Patent Application No. 62/337,154, entitled "EMERGENCY SERVICES SUPPORT FOR NON-CELLULAR WIRELESS ACCESS" filed May 16, 2016, the contents of which are incorporated by reference herein in their entirety for all purposes.

FIELD

The described embodiments generally relate to wireless communications, including methods and apparatus to support emergency services sessions via non-cellular wireless access networks by a wireless communication device.

BACKGROUND

Fourth generation (4G) cellular wireless networks, which use newer radio access technologies that implement one or more $3^{rd}$ Generation Partnership Project (3GPP) Long Term Evolution (LTE) and LTE Advanced (LTE-A) standards, are rapidly being developed and deployed by network operators worldwide. The newer cellular wireless networks provide a range of packet based services in parallel with legacy second generation (2G) and third generation (3G) wireless networks that can provide both circuit-switched voice services and packet-switched data services. The cellular wireless networks overlap with multiple wireless local area network (WLAN) based networks, which provide additional localized high-speed access for various services. Wireless communication devices can include capabilities to connect with different wireless networks individually or in parallel based on various criteria, e.g., based on what wireless networks are available at a particular location, based on various capabilities of available wireless networks, based on capabilities of the wireless communication device, based on properties of particular services provided by one or more of the wireless networks, and/or based on service subscriptions with which the wireless communication device and/or the user thereof is associated. Wireless communication devices can include wireless radio circuitry that provides for communication via multiple radio frequency interfaces that can connect through different wireless networks individually and/or in parallel. Wireless cellular network service providers are adding WLAN connectivity to provide access to cellular services through WLAN networks for cellular service subscribers to supplement access via cellular wireless access networks, including access to access emergency services, such as "911" and "e911", or their equivalents, via non-cellular wireless access networks. As such, there exists a need for mechanisms to support access to emergency services sessions for a wireless communication device, when roaming in a visited country/region.

SUMMARY

Apparatus and methods to support emergency services access via non-cellular wireless networks for a wireless communication device, such as a user equipment (UE), are disclosed. Representative embodiments include methods and apparatus to select an evolved Packet Data Gateway (ePDG) for emergency services sessions when the UE is roaming and to determine local emergency services numbers for Internet Protocol Multimedia Subsystem (IMS) sessions via a non-cellular wireless access network, such as via an untrusted wireless local area network (WLAN). When the UE is roaming, the UE determines a PLMN with an ePDG that supports emergency services by querying a network-based server, such as a Domain Name System (DNS) server, for PLMNs that support emergency services ePDGs and are associated with a Mobile Country Code (MCC) for a country/region in which the UE operates. The UE also determines an ePDG of the PLMN that supports emergency services by further querying the network-based server. In response to detecting an attempt to establish an emergency services session via a non-cellular wireless access network, the UE establishes a connection with the ePDG of the PLMN that supports emergency services. The UE further determines a set of local emergency services numbers, each number associated with an emergency services category type, by querying the network-based server. Solutions provided herein may be used as part of and/or in conjunction with one or more 3GPP wireless communication protocols.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
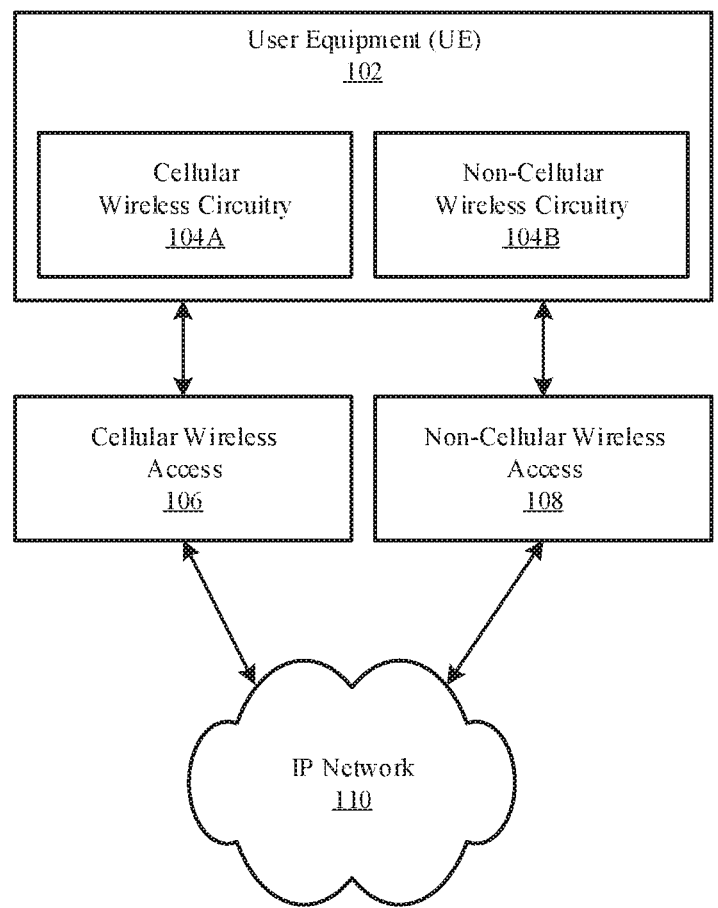
FIG. 1 illustrates an exemplary wireless communication device configurable to connect individually or in parallel through a cellular wireless access network and a non-cellular wireless access network, in accordance with some embodiments.

Representative examples for supporting emergency services sessions via non-cellular wireless access networks for wireless communication devices when roaming are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

Overview

Apparatus and methods to support emergency services sessions, by network elements and by a wireless communication device, such as by a user equipment (UE), via non-cellular wireless access networks when the UE is roaming are disclosed. Representative embodiments include methods and apparatuses to support obtaining by the UE when roaming, and/or providing to the UE, emergency services information that the UE can use to establish emergency services sessions in a country/region in which the UE operates. Emergency services sessions can be established when the UE is unable to authenticate, such as when the UE has no installed Universal Subscriber Identity Module (USIM), including no available physical SIM or no available electronic SIM (eSIM) for an embedded Universal Integrated Circuit Card (eUICC), or when the UE is operating in a location in which no available SIM or eSIM can be used, such as when restricted from regular services due to the UE's geographic location or when the UE is operating in a visited network without an existing roaming agreement between the UE's Home Public Land Mobile Network (HPLMN) and a visited PLMN (VPLMN). As not all PLMNs may support emergency services access via non-cellular wireless access networks, when the UE is roaming, the UE can determine one or more PLMNs that support emergency services sessions via non-cellular wireless access applicable for a country/region in which the UE operates. The UE can send a query to a network-based server, such as a Domain Name System (DNS) server, to obtain a response that includes a list of PLMNs that support emergency services sessions through evolved Packet Data Gateways (ePDGs), which interconnect non-cellular wireless access networks to Internet Protocol (IP) networks via Packet Data Network (PDN) gateways. The query to the network-based server can include a mobile country code (MCC) for the country/region in which the UE operates. The response from the network-based server can list PLMNs applicable for the MCC provided by the UE. Each PLMN that supports emergency services sessions can deploy one or more ePDGs that can provide connections for emergency services sessions. The UE selects a PLMN based on information obtained from the network-based server. As the selected PLMN may have a limited number of ePDGs that support emergency services sessions, the UE can also send a query to the network-based server to obtain a list of IP addresses for ePDGs that support emergency services sessions.

When a UE is roaming and detects an attempt to establish an emergency services session via an non-cellular wireless access network, the UE can select an applicable ePDG that supports emergency services sessions of a PLMN in the country/region in which the UE is located. In some embodiments, the UE is already connected to an ePDG that supports emergency services sessions for the local country/region in which the UE is operating. In some embodiments, the UE is connected to an ePDG that does not support emergency services sessions for the local country/region in which the UE is operating, or the UE is not connected to any ePDG. The UE can determine an MCC for the region in which the UE is operating and send one or more queries to a network-based server to determine a PLMN and/or an IP address of an ePDG for a PLMN that supports emergency services sessions for the country/region in which the UE operates. In some embodiments, the UE sends one or more DNS Name Authority Pointer (NAPTR) queries to a DNS server to obtain information by which to identify one or more PLMNs for the country/region in which the UE operates and one or more ePDGs of a selected PLMN. The UE can use DNS NAPTR queries to discover an ePDG that supports emergency services sessions for the country in which the UE operates, particularly when roaming in a visited country/region different from a home country/region with which the UE is associated. In some embodiments, the UE sends queries formatted using a generic domain name that is resolvable by the UE and/or by network nodes, e.g., by a network-based server, where the generic domain name includes an indication that the UE is roaming, e.g., by using a "visited-country" label in the domain name, and also includes a value for the MCC that uniquely identifies the country/region in which the UE operates. In some embodiments, the MCC value is a three digit numerical value. In some embodiments, the generic domain name takes the following form:

<service_id>.mcc<MCC>.visited-
       country.pub.3gppnetwork.org

In some embodiments, the service_id field uses the value epdg.epc to refer to a Fully Qualified Domain Name (FQDN) service for the visited country in which the UE operates. In some embodiments, a specific domain name (including a particular value for the MCC) of epdg.epc.mcc<MCC>.visited-
       country.pub.3gppnetwork.org can be used by the UE to discover whether regulatory requirements mandate the selection of ePDGs in the visited country in which the UE operates through which to establish non-emergency services sessions.

To obtain information for the selection of ePDGs through which to establish emergency services sessions, the UE can use a different specific domain name, including the particular value for the MCC in which the UE operates, with a service_id value of "sos.epdg.epc" to indicate a query for information for emergency services sessions (rather than for non-emergency services sessions). The specific domain name used can be sos.epdg.epc.mcc<MCC>.visited-country.pub.3gppnetwork.org which can represent a "Emergency ePDG FQDN" and have a total of eight labels. The last three labels can be "pub.3gppnetwork.org", the fourth label can be "visited-country", the third label can uniquely identify the MCC of the visited country/region, while the first three labels can be "sos.epdg.epc". The UE can send a DNS NAPTR query to a DNS server to resolve the "Emergency ePDG FQDN". The DNS server can provide a response to the UE, the response including information to identify one or more PLMNs for the MCC identified in the DNS NAPTR query and that support emergency services sessions via one or more ePDGs for access through non-cellular wireless access networks by the UE. The DNS response to the DNS query can include multiple records, each record identifying a PLMN of the visited country/region that can be used to select an emergency services session ePDG. A representative format for a record of the DNS response can include sos.epdg.epc.mnc<MNC>.mcc<MCC>.pub.3gppnetwork.org where the PLMN is uniquely identified by the combination of Mobile Network Code (MNC) and MCC values included in the record. The last three labels can be "pub.3gppnetwork.org", while the combination of the third and fourth labels can uniquely identify the PLMN that supports emergency services sessions via non-cellular wireless access. The first three labels can be "sos.epdg.epc".

The UE can select a PLMN to use when attempting emergency services sessions via non-cellular wireless access according to a selection procedure. When the UE is attached to a VPLMN via a cellular wireless access and the response from the DNS server to the DNS query included a record that indicated the VPLMN, to which the UE is attached, supports emergency services sessions via non-cellular wireless access, the UE can select the VPLMN for emergency services sessions. When the UE is not attached to a VPLMN or is attached to a VPLMN that does not support emergency services sessions via non-cellular wireless access networks, e.g., no record in the list includes the VPLMN to which the UE is attached, then the UE determines a PLMN for emergency services sessions as follows. If the UE is provisioned with information for the selection of an ePDG for emergency services, e.g., provisioned by an HPLMN with which the UE is associated, the UE can select an ePDG from a PLMN included in the response from the DNS server to the DNS query, e.g., a PLMN listed in the record as supporting emergency services sessions, and also listed in the information for selection of an ePDG for emergency services provisioned by the HPLMN with which the UE is associated. In some embodiments, the UE selects the PLMN listed in the response from the DNS server and having the highest priority as indicated by the information for selection of an ePDG for emergency services provisioned by the HPLMN. When the UE is not provisioned with information for the selection of an ePDG for emergency services or when the emergency services PLMN/ePDG selection information provided by the HPLMN does not include any of the PLMNs included in the response from the DNS server, the UE can select one of the PLMNs in the response from the DNS server based on a UE specific implementation. Using the selected PLMN, the UE can send a second DNS query to the DNS server, the second DNS query including an ePDG FQDN that includes a unique identifier, e.g., an MCC/MNC value pair, for the selected PLMN and that starts with "sos.epdg.epc" and ends with "pub.3gppnetwork.org". The DNS server can respond to the second DNS query with a set of one or more IP addresses for one or more ePDGs that support emergency services sessions via non-cellular wireless access networks. The DNS server can resolve the ePDG FQDN included in the second DNS query for the UE so that the UE can use the provided IP addresses to access an ePDG that is configured to support emergency services sessions via non-cellular wireless access networks. If the UE receives no DNS response from the DNS server to resolve the ePDG FQDN for the selected PLMN included in the second DNS query, the UE can select a different PLMN and retry to resolve another ePDG FQDN by sending additional DNS queries to the DNS server. In some embodiments, the UE selects PLMNs indicated in the response from the DNS server to the first DNS query based on a priority order for PLMNs as indicated in provisioned information from the HPLMN. If the UE is unable to receive a response to resolve an ePDG FQDN for any selected PLMN, the UE can use an ePDG indicated for emergency services sessions for the HPLMN with which the UE is associated.

In addition to PLMNs and ePDGs that support emergency services sessions via non-cellular wireless access networks, the UE can seek to determine a set of one or more local emergency services numbers to use when roaming to a VPLMN in a visited country/region. In some embodiments, a local emergency services number can be used for the UE to access emergency services of a particular emergency services type. In some embodiments, the UE can perform an IMS emergency services session call establishment procedure using one or more local emergency services numbers to access emergency services by an non-cellular wireless access network. If the UE is able to access the VPLMN network via a cellular wireless access network when roaming, the UE can obtain a set of local emergency services numbers from the VPLMN, e.g., in an ATTACH ACCEPT message and/or in a TRACKING AREA UPDATE ACCEPT message received from the cellular wireless network. In some embodiments, the UE can store the set of local emergency services numbers obtained from the VPLMN to use when attached to and/or when detached from the VPLMN, while in the same country/region of the VPLMN. In some embodiments, the UE can re-use the set of local emergency services numbers obtained from the VPLMN when operating in the same country/region as the VPLMN. In some embodiments, the UE can obtain a list of local emergency services numbers from an access point (AP) with which the UE is associated. The list of local emergency services numbers obtained from the AP can be applicable to a country/region (geographic location) in which the AP is situated (and in which the UE is operating). In some embodiments, the list of local emergency services numbers can be obtained from the AP using Access Network Query Protocol (ANQP) procedures during and/or after associated with the AP by the UE. In some embodiments, local emergency services numbers can be obtained from Hotspot 2.0 compatible Wi-Fi APs.

The UE can obtain a set of local emergency services numbers to access emergency services of different emergency services types by querying a network-based server, e.g., by sending a DNS query to a DNS server, which can be located in the same country/region in which the UE is operating. The UE can obtain an IP address of the DNS server, from which to obtain the set of local emergency services numbers, from the ePDG. The UE can use a domain name that includes a service ID for local emergency services number access. In some embodiments, the domain name includes a service ID of "emergency-number-list.epc". In some embodiments, the UE sends a DNS query to a DNS server using an Emergency Number List FQDN having a format of
emergency-number-list.epc.mcc<MCC>.visited-country.pub.3gppnetwork.org
where the fourth label of the FQDN includes an MCC value that uniquely identifies the country/region in which the UE operates. The last three labels of the Emergency Number List FQDN are "pub.3gppnetwork.org", the fourth label is "visited-country", and the first two labels are "emergency-number-list.epc". In some embodiments, the UE sends a DNS NAPTR query to a DNS server to resolve the Emergency Number List FQDN. In response to the DNS NAPTR query, the DNS server can provide a list including one or more records, each record in the DNS response including a local emergency services number applicable for a corresponding emergency services type and usable within the country/region specified by the MCC value included in the DNS NAPTR query. In some embodiments, the emergency services category is specified in accordance with the 3GPP Technical Specification (TS) 24.008. In some embodiments, each record of the DNS response can include one of the following emergency services categories: sos, sos-police, sos-ambulance, sos-fire, sos-marine, or sos-mountain.

Non-Cellular Wireless Access

Wireless service providers are deploying non-cellular wireless access networks, such as wireless local area networks (WLANs), in parallel with cellular wireless access networks to expand options for access to evolved packet core (EPC) services, such as Internet Protocol Multimedia Subsystem (IMS) based services including voice over IP (VOIP), and "Application" type services including visual voice mail (VVM), short message service (SMS), and multimedia message service (MMS). Access to these EPC services through a trusted WLAN can be realized using an S2a reference point interface, and access through an untrusted WLAN network can be realized using an S2b reference point interface. Wireless communication devices can support packet data network (PDN) connections through multiple wireless interfaces, such as via a cellular wireless interface and via a trusted or untrusted WLAN interface, both individually and in parallel. Wireless service providers can control access to services depending upon various criteria including, but not limited to, a location of the wireless communication device, whether the wireless communication device is on a "home" network or on a "roaming" network, based on the type of connection through which the wireless communication device connects including security establishment, a radio access technology (RAT) type for the access connection, a wireless communication device and/or user's subscription profile, etc. In order to ensure secure communication, connections by a wireless communication device that traverse an S2b reference point can use an Internet Key Exchange Version 2 (IKEv2) protocol between the wireless communication device and an evolved packet data gateway (ePDG).

To establish a connection, the wireless communication device uses authentication procedures based on EAP-AKA to access via an untrusted WLAN or based on EAP-AKA' to access via a trusted WLAN without requiring input for a user of the wireless communication device. An authentication failure can occur, for different reasons, such as when the wireless communication device accesses via a WLAN that is deployed by a visited PLMN (VPLMN) into which the wireless communication device does not have permission to roam, or when the wireless communication device and/or a user thereof is not authorized to access the services of the EPC for the cellular service provider. Access to emergency services, however, can be required irrespective of a location at which the wireless communication device operates or of a subscription service for a user of the wireless communication device. In fact, a wireless communication device without an installed SIM (physical or electronic) can be configured to allow access to emergency services, and wireless service providers can allow establishment of emergency services sessions for the wireless communication device without completion of a regular authentication and authorization procedure. A wireless service provider can allow for access to emergency services via a cellular wireless access network or via a non-cellular wireless access network.

When roaming to a visited country/region, a wireless communication device can obtain emergency services information, such which PLMNs in the visited country/region maintain ePDGs that can provide emergency services access via non-cellular wireless access networks. Moreover, the wireless communication device can also obtain a set of local emergency services numbers for different emergency services categories to use when attempting to access emergency services in the visited country/region, including when attempting to establish an IMS connection via non-cellular wireless access. The wireless communication device can obtain the emergency services information by querying a network-based server and receiving responses that list applicable PLMNs for the visited country/region, ePDG IP addresses associated with a selected PLMN, or local emergency services numbers for the visited country/region.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) LTE and LTE Advanced (LTE-A) or similar "later generation" cellular wireless access communication capabilities as well as wireless local area network communication capabilities. In various embodiments, these capabilities may allow a respective UE to communicate and manage simultaneous IP flows via multiple wireless access networks.

Additionally, it should be understood that the UEs described herein may be configured as multi-mode wireless communication devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, and LTE-A standards or 3GPP2's CDMA2000 (1×RTT, 2×EV-DO, HRPD, eHRPD) standards. Multi-mode UEs can also support communication using wireless local area networking protocols, e.g., IEEE 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

FIG. 1 illustrates an example wireless system 100 that includes an example wireless communication device, e.g., a user equipment (UE) 102, which includes wireless circuitry that can be configured to connect the UE 102 with one or more wireless networks individually or in parallel. The UE 102 includes both cellular wireless circuitry 104A, which can be configured to connect the UE 102 through a cellular wireless access 106 (which can also be referred to as a cellular wireless access network) to various services provided via an Internet Protocol (IP) packet based network 110, and non-cellular wireless circuitry 104B, which can be configured to connect the UE 102 through a non-cellular wireless access 108 (which can also be referred to as a non-cellular wireless access network) to the same IP network 110. An LTE evolved packet system (EPS) provides services to the UE 102, both "real-time" services, such as voice/video conference calls, and data communication services, such as web browsing and email access, using an IP protocol. The LTE EPS, as introduced in the Release 8 3GPP wireless communication standard, defines an architecture in which heterogeneous wireless access systems, such as a combination of cellular wireless access 106 and non-cellular wireless access 108, can be used by the UE 102 to connect to a common core network (not shown). The UE 102 can establish a packet data network (PDN) connection through one wireless access and subsequently add or change to a second wireless access. The UE 102 can communicate over multiple wireless accesses, such as the cellular wireless access 106 and the non-cellular wireless access 108, individually or simultaneously using the same PDN connection. In some circumstances, a wireless service provider can allow access to emergency services through either type of wireless access, e.g., the cellular wireless access 106, and through another type of wireless access, e.g., the non-cellular wireless access 108 without requiring completion of authentication by the UE 102. Thus, the UE 102 can access emergency services through an non-cellular wireless access network, such as an untrusted WLAN, via an S2b interface IPSec tunnel or via a cellular wireless access network. The UE 102 can obtain a list of one or more PLMNs applicable to a visited country/region in which the UE 102 operates in order to access emergency services via the non-cellular wireless access 108. The UE 102 can also obtain a set of IP addresses for ePDGs that support emergency services sessions for a selected PLMN applicable to the visited country/region in which the UE 102 operates. The UE 102 can further obtain a set of local emergency services numbers to use, e.g., when seeking to establish an emergency services session IMS connection via an ePDG of a selected PLMN in a visited country/region in which the UE 102 operates.

The cellular wireless circuitry 104A and the non-cellular wireless circuitry 104B provide for wireless radio frequency (RF) connections between the UE 102 and parallel wireless networks, which interconnect with the IP network 110 via the cellular wireless access 106 and the non-cellular wireless access 108 respectively. In some embodiments, the wireless circuitry 104A/B includes one or more baseband processor(s), and a set of RF analog front-end circuitry. In some embodiments, the wireless circuitry 104A/B and/or a portion thereof can include or be referred to as one or more wireless transmitter(s)/receiver(s) or transceiver(s) or radio(s). The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 104A/B can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless access networks and/or wireless access equipment included therein.

Figure 2:
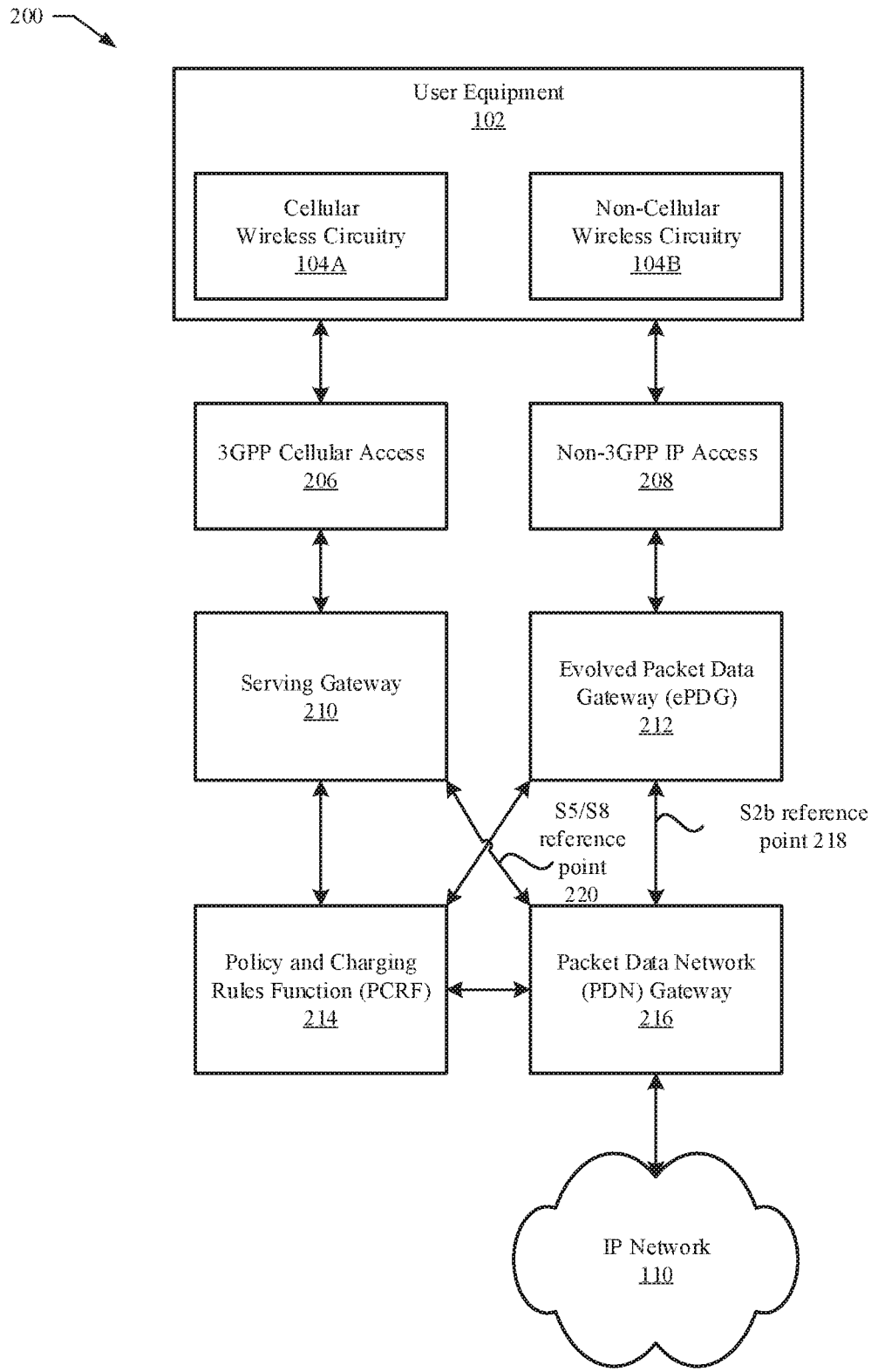
FIG. 2 illustrates example network elements of wireless access networks and a core network, in accordance with some embodiments.

FIG. 2 illustrates an example wireless system 200 that includes the UE 102 communicatively coupled to the IP network 110 through a 3GPP cellular access 206 and/or through a non-3GPP IP-based wireless access 208. In some embodiments, the 3GPP cellular wireless access 206 includes an evolved universal terrestrial access network (E-UTRAN) or other network elements of an LTE/LTE-A wireless network. In some embodiments, the non-3GPP IP access 208 includes a wireless local area network (WLAN) or portions thereof, e.g., a wireless access point, and thus the non-3GPP IP access 208 can also be referred to as a WLAN access. In some embodiments, the WLAN access can also be referred to as a Wi-Fi access to correspond to a WLAN that operates in accordance with an IEEE 802.11 wireless communication protocol. The UE 102 can be configured to connect individually and/or simultaneously to a given packet data network (PDN) through the 3GPP cellular wireless access 206 and the non-3GPP IP-based wireless access 208. The 3GPP cellular access 206 connects to a serving gateway (GW), which connects to a PDN gateway 216 through an S5 reference point 220 or an S8 reference point 220 for roaming users. The PDN gateway 216 provides a connection to the IP network 110 through which a variety of services can be accessed. The non-3GPP IP access 208 connects to an evolved packet data gateway (ePDG) 212, which connects to the PDN gateway 216 through an S2b reference point 218. Each of the serving gateway 210, the ePDG 212, and the PDN gateway 216 are also connected to a policy and charging rules function (PCRF) 214.

The 3GPP S2b reference point 218 between the ePDG 212 and the PDN gateway 216 provides a mechanism to allow the UE 102, when attached via a non-3GPP IP access network (e.g., non-3GPP IP access 208), to connect securely via a 3GPP evolved packet system (EPS) network to the IP network 110 and to access services via the secure connection. The UE 102 can establish a secure connection, e.g., an Encapsulating Security Payload (ESP) tunnel based on an IP Security (IPsec) protocol, using an IKEv2 protocol signaling exchange between the UE 102 and the ePDG 212, which in turn can establish a secure tunnel, e.g., a Proxy Mobile IPv6 (PMIP) or GTP tunnel, to the PDN gateway 216 when a session for the UE 102 is anchored.

Support for Emergency Services Access

In some embodiments, for the non-3GPP IP access 208, e.g., such as a WLAN access, when establishing a new connection via the S2b reference point 218, the UE 102 can indicate that the new connection should be dedicated for emergency services, e.g., by providing an indication in a message sent to the ePDG 212 when establishing the new connection. When the UE 102 is roaming to a visited country/region, the UE 102 can seek to obtain emergency services information applicable to the visited country/region. The UE 102 can communicate with a network-based server to obtain a list of one or more different PLMNs that support emergency services sessions via an ePDG 212 and via non-3GPP IP access 208. The UE 102 can query a DNS server to obtain a list of PLMNs and further query the DNS server to obtain one or more IP addresses for ePDGs 212 to use for emergency services when attempting to establish an emergency services session via the non-3GPP IP access 208. The UE 102 can also query the DNS server to obtain a list of local emergency services numbers, which can be categorized according to different emergency service types provided by access to the local emergency service number.

Figure 3:
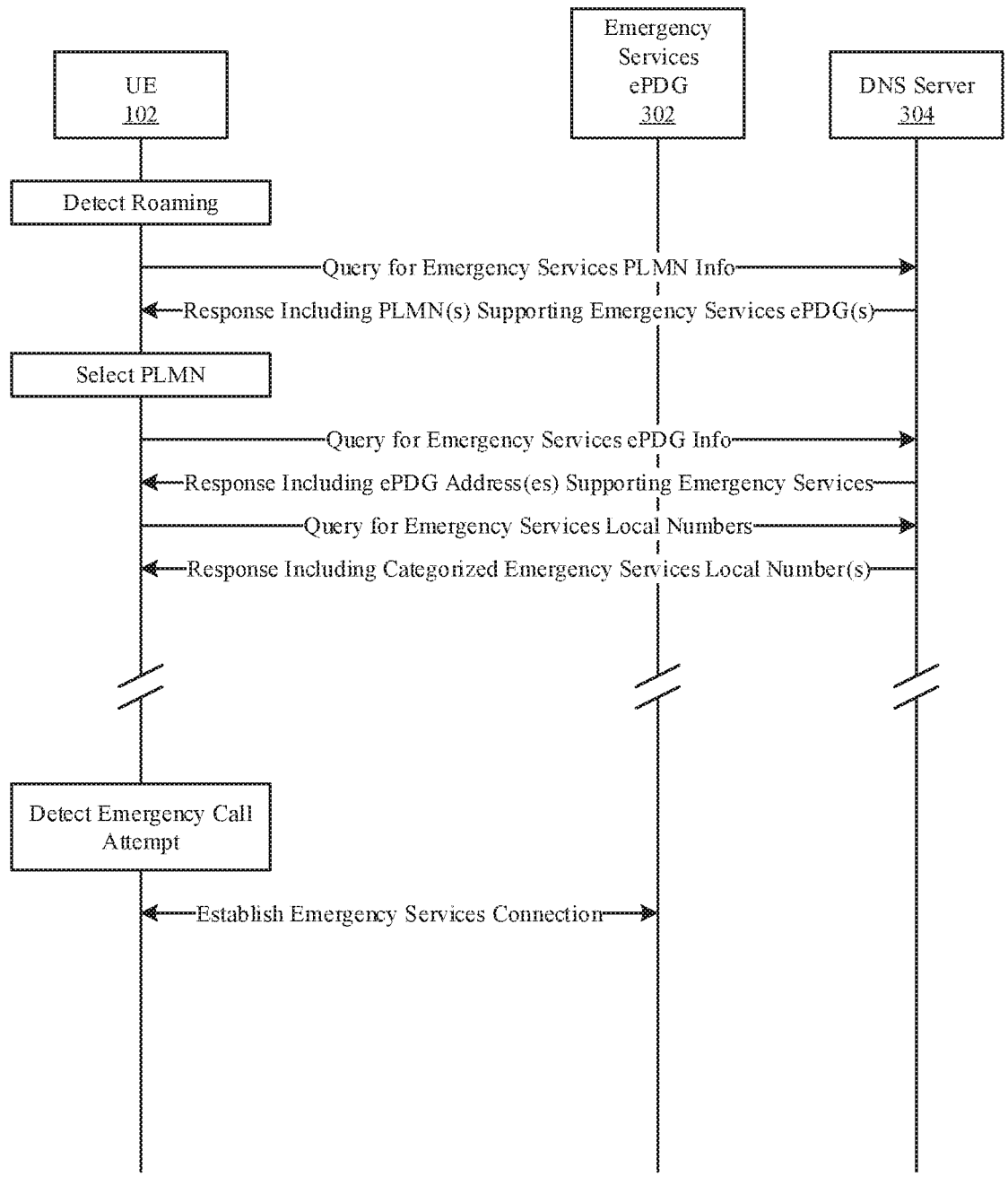
FIG. 3 illustrates a sequence diagram for an example message exchange to provide emergency services support information to a wireless communication device, in accordance with some embodiments.

FIG. 3 illustrates, in accordance with some embodiments, a sequence diagram 300 for an example message exchange to provide emergency services support information to a wireless communication device. The UE 102 detects a roaming state, in which the UE 102 is roaming to a visited country/region. In some embodiments, the visited country/region differs from a country/region of the HPLMN with which the UE 102 is normally associated. The UE 102 sends a query to a network-based server, e.g., a DNS query to DNS server 304, the query including an indication that the UE is in a visited country/region, an MCC value determined by the UE 102 for the visited country/region, and a service identifier (service_id) that is specified for emergency services queries. In some embodiments, the indication that the UE is in the visited country/region includes the label "visited-country" in the DNS query. In some embodiments, the DNS query includes the label "sos.epdg.epc" in the DNS query to indicate that the UE seeks information for emergency services. In some embodiments, the DNS query includes a total of eight labels, where the last three lables are "pub.3gppnetwork.org", the fourth label is "visited-country", the third label uniquely identifies the MCC of the visited country/region, and the first three labels are "sos.epdg.epc". In some embodiments, the UE 102 sends a DNS NAPTR query to the DNS server 304 using the eight labels and receives a response that includes a list of PLMNs that support emergency services via at least one ePDG for access to emergency services via non-cellular wireless access networks, e.g., via the non-cellular wireless access 108 and/or the non-3GPP IP Access 208. In some embodiments, a record in the DNS response identifies a PLMN of the visited country/region that may be used for selection of an ePDG for emergency services. In some embodiments, the record in the DNS response substitutes a PLMN identity. In some embodiments, the DNS response includes a FQDN composed of eight labels, where the first three labels are "sos.epdg.epc", the fourth and fifth labels identify the PLMN, and the last three labels are "pub.3gppnetwork.org". In some embodiments, the PLMN is identified by a pair of values, a first value for a Mobile Network Code (MNC) and a second value for the MCC. In some embodiments, the third label includes "mnc" appended to a numerical MNC value and the fourth label includes "mcc" appended to a numerical MCC value. In some embodiments, the numerical values are three digit values. In some embodiments, the numerical values are two digit values, three digit values, or a combination thereof.

The UE 102 selects a PLMN from the list of PLMNs provided in the DNS response from the DNS server 304. When the UE 102 is already attached to a PLMN, via cellular access 106 or via 3GPP cellular access 206, and the PLMN is identified in the list of PLMNs provided in the DNS response from the DNS server 304, the UE 102 select the PLMN to which it is attached in order to select an emergency services ePDG 302 for access to emergency services. When the UE 102 is not attached to a PLMN, via cellular access 106 or via 3GPP cellular access 206, or when the UE 102 is attached to a PLMN that is not included in any of the records of the DNS response from the DNS server 304, the UE 102 selects a PLMN from the list of PLMNs provided in the DNS response from the DNS server 304 as follows. If the UE 102 is provisioned with emergency services selection information by the HPLMN of the UE 102, the UE 102 selects a PLMN included in the DNS response that has the highest priority in accordance with the emergency services selection information provisioned by the HPLMN of the UE 102. If the UE 102 is not provisioned with emergency services selection information by the HPLMN of the UE 102, or if the UE 102 is provisioned with emergency services selection information by the HPLMN of the UE 102 but none of the PLMNs in the DNS response are also indicated in the emergency services selection information provisioned by the HPLMN, then the UE 102 selects a PLMN from those listed in the DNS response from the DNS server 304 using a UE specific implementation.

After selection of a PLMN from the set of PLMNs indicated in the DNS response received from the DNS server 304, the UE 102 sends another query, e.g., a second DNS query, to the DNS server 304 to obtain emergency services ePDG 302 information. The second DNS query includes an indication of the selected PLMN, e.g., an MNC/MCC pair, as two labels within an FQDN that starts with "sos.epdg.epc" and ends with "pub.3gppnetwork.org". The indication of the selected PLMN can be in accordance with the format provided by the DNS response, e.g., "mnc" appended to an MNC value followed by "mcc" appended to an MCC value, the two values separated by a period. The UE 102 sends the second DNS query to the DNS server 304 to resolve the constructed ePDG FQDN into a set of one or more IP addresses of one or more emergency services ePDGs 302 that support emergency services sessions via non-cellular wireless access, e.g., via non-cellular wireless access 108 or via Non-3GPP IP Access 208.

When the UE 102 receives no DNS response to the second DNS query and emergency services selection information provided by the first DNS response to the first DNS query includes multiple PLMNs for the visited country/region, the UE 102 can select another PLMN value and repeat the second DNS query to obtain IP addresses of emergency services ePDGs 302 for the subsequently selected PLMN. In some embodiments, the UE 102 selects different PLMNs in accordance with a priority order for PLMNs as indicated by provisioning information from the HPLMN with which the UE 102 is associated. In some embodiments, when no response is received from any DNS queries for any of the PLMNs in the list of PLMNs provided by the first DNS response to the first DNS query, the UE 102 can attempt to access emergency services via an ePDG 302 of the HPLMN.

In an exemplary embodiment, in which the UE 102 is roaming in the country of Hungary, the UE 102 sends a DNS NAPTR query to the DNS server 304 with the MCC value set to "216", e.g., the DNS query includes the following string sos.epdg.epc.mcc216.visited-country.pub.3gppnetwork.org and the DNS server 304 returns with a DNS response that includes a list of entries, which can be separated by commas as follows sos.epdg.epc.mnc01.mcc216.pub.3gppnetwork.org, sos.epdg.epc.mnc30.mcc216.pub.3gppnetwork.org.

In the exemplary embodiment, the UE 102 is provisioned with emergency services selection information by its HPLMN including a set of PLMN identifiers listed in a priority order as follows mcc216.mnc70, mcc216.mnc30, mcc216.mnc01 which prioritizes MNC value 70 over MNC value 30 over MNC value 01. The UE 102 can select the PLMN corresponding to the labels "mcc216.mnc30", which is listed in both the response from the DNS server 304 and in the emergency services selection information provided by its HMPLN and has a higher priority than the other PLMN also listed. The UE 102 can send a second DNS query to the DNS server 304 to resolve into an IP address the following string sos.epdg.epc.mnc30.mcc216.pub.3gppnetwork.org.

The UE 102 can also query a DNS server for emergency services local numbers applicable to the visited country/region in which the UE 102 operates. In some embodiments, the DNS server from which the UE 102 obtains emergency local numbers can be located in the same visited country/region in which the UE 102 is operating. In some embodiments, the UE 102 obtains an IP address for the DNS server from which to obtain emergency local numbers from the emergency services ePDG 302. In some embodiments, the DNS server from which the UE 102 obtains emergency local numbers is the DNS server 304. In some embodiments, the DNS server from which the UE 102 obtains emergency local numbers is different from the DNS server 304, e.g., when the DNS server 304 to which the initial query for emergency services PLMN information is not located in the country/region in which the UE 102 is operating. In the description that follows, the DNS server from which the emergency local numbers are obtained is indicated as DNS server 304; however, it should be understood that each of different queries for emergency services PLMN information, for emergency services ePDG information, and for emergency services local numbers can be sent to the same DNS server or to distinct DNS servers. At least for the query for local emergency services local numbers, the query sent by the UE 102 can be sent to a DNS server that is located in the country/region in which the UE 102 operates. In some embodiments, an IP address for the DNS server from which to obtain local emergency services local numbers can be obtained from the emergency services ePDG 302.

The UE 102 can send to the DNS server 304 the following string emergency-number-list.epc.mcc<MCC>.visited-country.pub.3gppnetwork.org which includes a service ID for emergency services local numbers two labels specified as "emergency-number-list" in the first label and "epc" in the second label. The third label of the string can uniquely identify the country/region in which the UE 102 operates, e.g., using an MCC numerical value appended to "mcc". The fourth label can be "visited-country" to indicate the UE 102 is roaming to a visited country/region, while the last three labels can be set to "pub.3gppnetwork.org". The UE 102 sends a DNS NAPTR query to the DNS server 304, which can be located in the same country/region in which the UE is operating, to obtain emergency services local numbers applicable to the country/region specified by the MCC value included in the DNS NAPTR query. In some embodiments, the UE 102 can obtain an IP address of the DNS server 304 from the ePDG 302. The DNS server 304 can respond with one or more emergency services local numbers, which can be also categorized according to the emergency services type that the local number corresponds. In some embodiments, the DNS server 304 responds with a list of one or more FQDNs, each FQDN formatted with six labels as follows <Emergency-Number>.<Emergency-Service-Category>.mcc<MCC>.pub.3gppnetwork.org where the first label includes a numerical value for the emergency services local number applicable to the country/region specified by the MCC value of the third label and for the emergency service category specified by the second label. The last three labels can be "pub.3gppnetwork.org". The DNS response can include a record of multiple emergency services local numbers separated by commas. Each record in the DNS response can include an emergency services local number that corresponds to a particular emergency services category type. In some embodiments, the emergency services category types can include one or more of sos, sos-police, sos-ambulance, sos-fire, sos-marine, or sos-mountain.

As an example embodiments, the UE 102, when roaming in the visited country Japan, can send a DNS query that includes the MCC value of "440" to specify Japan to the DNS server 304, the DNS query being formatted as emergency-number-list.epc.mcc440.visited-country.pub.3 gppnetwork.org to which the DNS server 304 can respond with a list of emergency services local numbers that are categorized and formatted as 110.sos-police.mcc440.pub.3gppnetwork.org,119.sos-ambulance.mcc440.publ3gppnetwork.org, 119.sos-fire.mcc440.publ3gppnetwork.org where the value "110" is the emergency services local number applicable in Japan for access to police emergency services, the value "119" is the emergency services local number applicable in Japan for access to ambulance services, and the value "119" is the emergency services local number applicable in Japan for access to fire services. As the example shows, different emergency services category types can use the same emergency services local number or different emergency services local numbers depending on regulatory requirements for the visited country/region.

After acquiring information for emergency services sessions, such as a PLMN that supports emergency services sessions, an ePDG IP address of the PLMN, and/or local numbers for access to emergency services, the UE 102, in response to detecting an attempt to establish an emergency services connection can establish an emergency services session with an emergency services capable ePDG 302. In some embodiments, the emergency services capable ePDG 302 can be reached using an ePDG IP address obtained from the DNS server 304. In some embodiments, the UE 102 uses an emergency services local number obtained from the DNS server 304 to establish the emergency services connection via the emergency services ePDG 302. In some embodiments, the emergency services connection can be established for the UE 102 via the emergency services ePDG 302 with access via an non-cellular wireless access network, e.g., via non-cellular wireless access 108 or via Non-3GPP IP access 208. In some embodiments, the emergency services connection can be established for the UE 102 via the emergency services ePDG 302 without requiring completion of authentication and/or authorization procedures.

Figure 4:
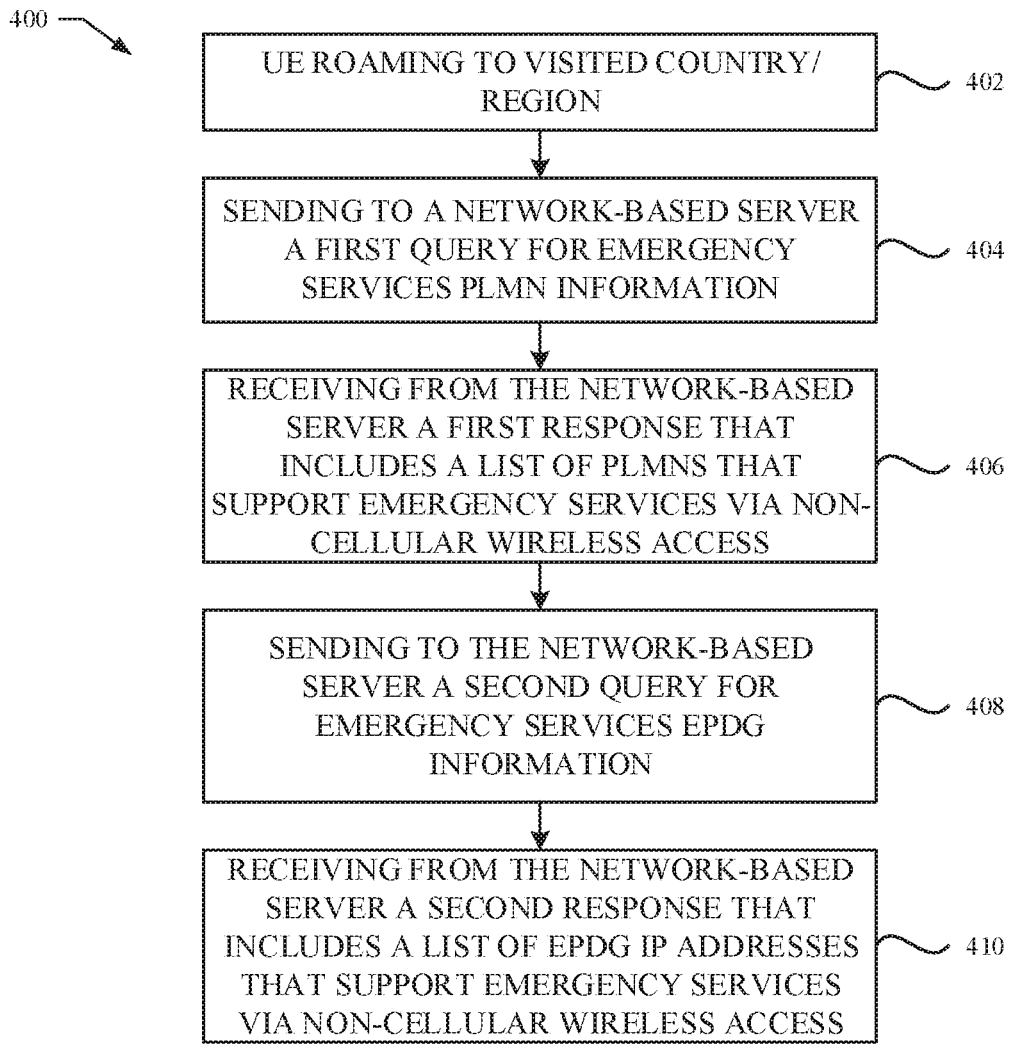
FIG. 4 illustrates an example method for a wireless communication device to obtain emergency services information, in accordance with some embodiments.

FIG. 4 illustrates a flow chart 400 of an example method for a wireless communication device to obtain emergency services information, in accordance with some embodiments. At 402, the UE 102 is roaming in a visited country/region. At 404, the UE 102 sends to a network-based server, e.g., to DNS server 304, a first query for emergency services PLMN information. At 406, the UE 102 receives from the network-based server, e.g., from DNS server 304, a first response that includes a list of PLMNs that support emergency services via a non-cellular wireless access network, e.g., via non-cellular wireless access 108 or via Non-3GPP IP Access 208. At 408, the UE 102 sends to the network-based server, e.g., to DNS server 304, a second query for emergency services ePDG information. At 410, the UE 102 receives from the network-based server, e.g., from DNS server 304, a list of ePDG IP addresses for ePDGs that support emergency services via a non-cellular wireless access network, e.g., via non-cellular wireless access 108 or via Non-3GPP IP Access 208.

In some embodiments, the queries sent by the UE 102 include DNS queries formatted as described herein. In some embodiments, the query for emergency services PLMN information includes an indication that the UE 102 is roaming in a visited country/region. In some embodiments, the query for emergency services PLMN information includes a service ID that specifies emergency services. In some embodiments, the query for emergency services PLMN information includes a unique identifier for the country/region in which the UE 102 operates. In some embodiments, the responses received by the UE 102 include DNS responses formatted as described herein. In some embodiments, the response includes a list of PLMNs, where each PLMN in the list supports emergency services sessions via a non-cellular wireless access network, e.g., via non-cellular wireless access 108 or via Non-3GPP IP Access 208. In some embodiments, each PLMN is identified by a MNC/MCC value pair. In some embodiments, the UE 102 selects a PLMN from the list of PLMNs returned from the network-based server based at least in part on emergency services information provisioned to the UE 102 by an HPLMN with which the UE 102 is associated. In some embodiments, the second query for emergency services ePDG information sent by the UE 102 includes the selected PLMN identified by a corresponding MNC/MCC value pair. In some embodiments, the response includes a list of ePDG IP address formatted as described herein.

Figure 5:
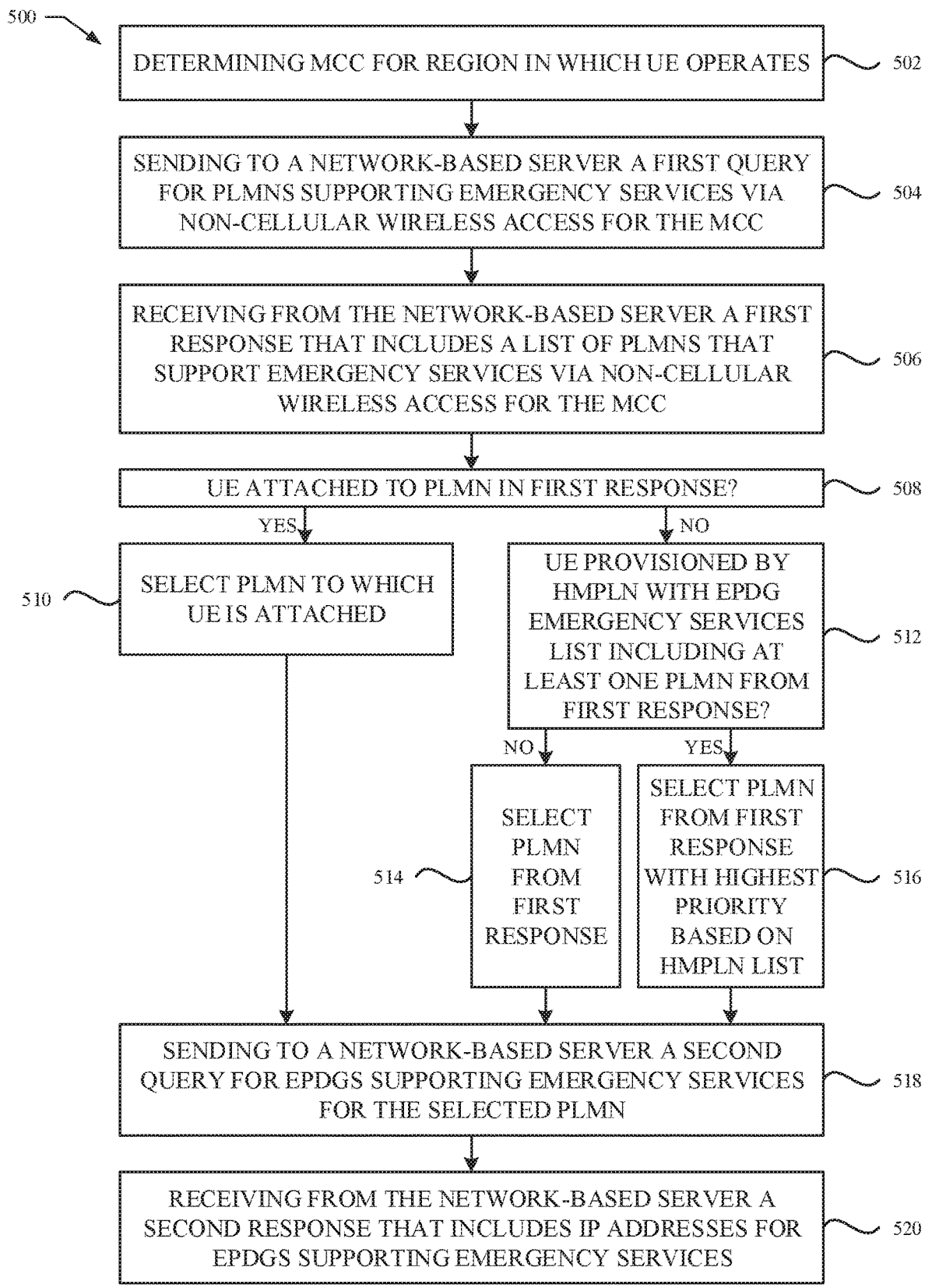
FIG. 5 illustrates another example method for a wireless communication device to obtain emergency services information, in accordance with some embodiments.

FIG. 5 illustrates a flow chart 500 of another example method for a wireless communication device to obtain emergency services information, in accordance with some embodiments. At 502, a UE 102 determines an MCC for a country/region in which the UE 102 operates. At 504, the UE 102 sends, to a network-based server, such as to DNS server 304, a first query for information regarding PLMNs that support emergency services via a non-cellular wireless access network, such as via non-cellular wireless access 108 or via Non-3GPP IP Access 208. The first query can include an indication of the MCC determined by the UE 102, e.g., a recognized numerical value that uniquely specifies the country/region in which the UE 102 operates. At 506, the UE 102 receives from the network-based server, such as from DNS server 304, a first response to the first query, the first response including a list of PLMNs that support emergency services via a non-cellular wireless access network for the MCC indicated in the first query. At 508, when the UE 102 is attached to a PLMN, the UE 102 determines whether the PLMN to which the UE 102 is attached is included in the list of PLMNs in the first response received from the network-based server. When the UE 102 is attached to a PLMN that is also listed in the list of PLMNs received from the network-based server, at 510, the UE 102 can select the attached PLMN for emergency services sessions via a non-cellular wireless access network. When the UE is attached to a PLMN that is not in the list of PLMNs received from the network-based server, or when the UE is not attached to a PLMN, the UE 102 can determine a PLMN from the PLMNs listed in the first response from the network-based server as follows. At 512, when the UE 102 is provisioned by a Home PLMN (HPLMN) with ePDG emergency services information, such as a list of PLMNs in a prioritized order, the UE 102 determines whether at least PLMN in the provisioned information is also listed in the list of PLMNs provided in the first response to the UE 102 by the network-based server. When there is at least one PLMN that appears in both the list of PLMNs received from the network-based server and in the ePDG emergency services information provisioned by the HPLMN, the UE 102, at 516, can select a PLMN from the list of PLMNs received in the first response from the network-based server based on a prioritization of PLMNs indicated in the provisioned ePDG emergency services information received from the HPLMN. When none of the PLMNs listed in the PLMN list provided in the first response to the UE 102 by the network-based server are listed also in the ePDG emergency services information provisioned by the HPLMN, the UE 102, at 514, can select a PLMN from the PLMN list provided in the first response to the UE 102 by the network-based server, e.g., by using a UE-dependent selection procedure.

After selection of a PLMN at 510, 514, or 516, the UE 102, at 518 sends to the network-based server, e.g., to DNS server 304, a second query for information regarding ePDGs that support emergency services sessions for the selected PLMN. At 520, the UE 102 receives from the network-based server, e.g., from DNS server 304, a second response that includes one or more IP addresses for one or more ePDGs that support emergency services sessions via a non-cellular wireless access network for the selected PLMN. In some embodiments, the queries sent to the network-based server and/or the responses received from the network-based server are formatted as NAPTR queries as described herein. For example, the queries to the network-based server can include a label that indicates that the UE 102 is roaming in a visited-country and a label that indicates the UE 102 seeks information for emergency services sessions. In some embodiments, the queries to the network-based server include a numerical value for an MCC and the responses from the network-based server include at least one numerical value pair for the MCC and an MNC that together uniquely specify a PLMN that supports emergency services sessions via a non-cellular wireless access network. In some embodiments, the second query for information regarding ePDGs includes the numerical value pair for the MCC and the MNC that uniquely specify a PLMN selected by the UE 102, and the second response includes at least one IP address for an ePDG that supports emergency services sessions via a non-cellular wireless access network for the PLMN selected by the UE 102.

Figure 6:
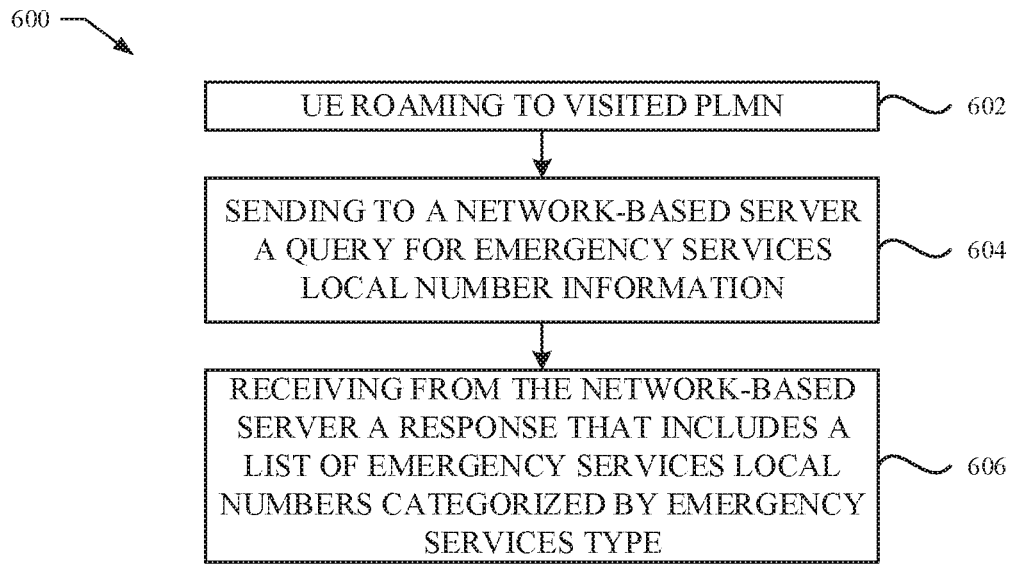
FIG. 6 illustrates a further example method for a wireless communication device to obtain emergency services information, in accordance with some embodiments.

FIG. 6 illustrates a flow chart 600 of a further example method for a wireless communication device to obtain emergency services information, in accordance with some embodiments. At 602, a UE 102 determines an MCC for a country/region in which the UE 102 operates. At 604, the UE 102 sends to a network-based server, e.g., to DNS server 304, a query for information regarding local numbers to use for emergency services sessions. At 604, the UE 102 receives from the network-based server, e.g., from DNS server 304, a response that includes a list of emergency services local numbers categorized by emergency services type. In some embodiments, the query to the network-based server includes a numerical value for the MCC for the country/region determined by the UE 102, a label that indicates that the UE 102 is roaming in a visited country/region, and/or a label that indicates a request for emergency services numbers. In some embodiments, the query sent to the network-based server is formatted as described herein. In some embodiments, the response from the network-based service includes a list of local numbers to use for emergency services, each number in the list categorized by a label for an emergency services type. In some embodiments, a single local number corresponds to multiple emergency services types. In some embodiments, the response received from the network-based server that includes the list of local numbers for emergency services is formatted as described herein.

Figure 7:
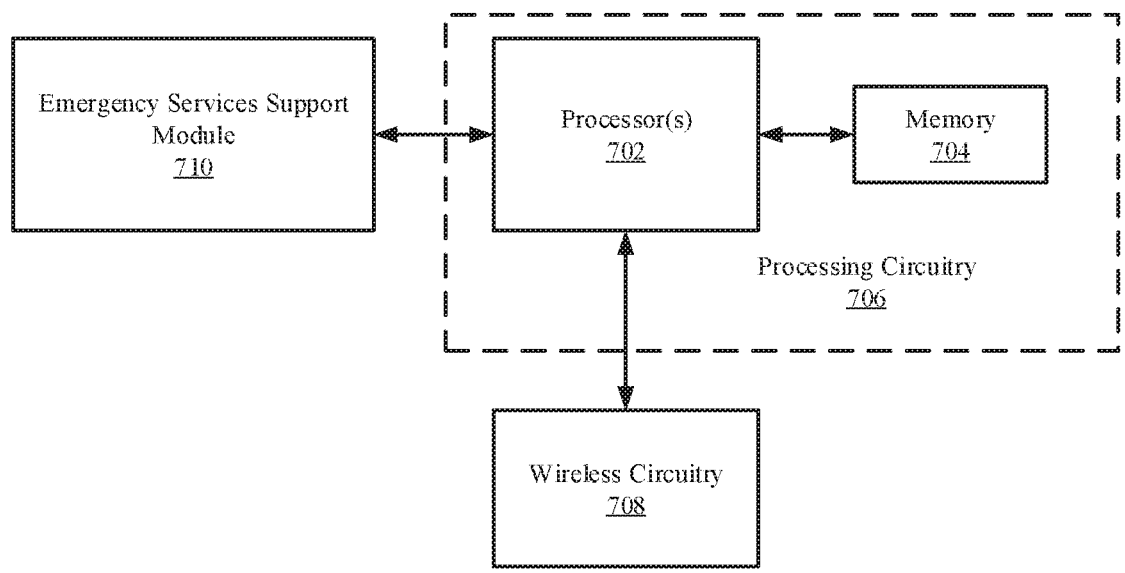
FIG. 7 illustrates an exemplary set of elements to support emergency services in a wireless communication device, in accordance with some embodiments.

FIG. 7 illustrates, in accordance with some embodiments, a diagram 700 of components of a wireless communication device, such as UE 102, including one or more processor(s) 702 coupled to memory 704, which together can be referred to as processing circuitry 706, wireless circuitry 708 that provides for wireless radio frequency (RF) connections between the UE 102 and various wireless networks, e.g., the 3GPP cellular access 206 using the cellular wireless circuitry 104A and/or the non-3GPP IP access 208 using the non-cellular wireless circuitry 104B. The UE 102 can also include an emergency services support module 710 configurable to operate together with the processing circuitry 706 and the wireless circuitry 708 to perform one or more operations for the UE 102 as described herein to provide support for access to emergency services sessions, such as when the UE 102 roams to a visited country/region and seeks information for PLMNs, ePDGs, and/or local numbers for emergency services sessions that can be established via a non-cellular wireless access network. In some embodiments, the wireless circuitry 708 includes one or more baseband processor(s), and a set of RF analog front-end circuitry. In some embodiments, the wireless circuitry 708 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 708 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless networks.

The processor(s) 702 and the wireless circuitry 708 can be configured to perform and/or control performance of one or more functionalities of the UE 102, in accordance with various implementations. The processor(s) 702 and the wireless circuitry 708 can provide functionality for querying for information for establishing connections (sessions), including emergency services sessions, as described herein. The processor(s) 702 may include multiple processors of different types that can provide for both wireless communication management and/or higher layer functions, e.g., one or more of the processor(s) 702 may be configured to perform data processing, application execution, and/or other device functions according to one or more embodiments of the disclosure. The UE 102, or portions or components thereof, such as processor(s) 702, can include one or more chipsets, which can respectively include any number of coupled microchips thereon.

In some embodiments, the processor(s) 702 may be configured in a variety of different forms. For example, the processor(s) 702 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 502 of the UE 102 can be coupled to and/or configured in operative communication with each other, and these components may be collectively configured to provide for obtaining information for emergency services sessions, including but not limited to when the UE 102 is roaming in a visited country/region and seeks to obtain PLMNs, ePDGs, and/or local numbers for emergency services sessions. In some implementations, the processor(s) 702 can be configured to execute instructions that may be stored in memory 704, or that can otherwise be accessible to the processor(s) 702 in some other device memory. As such, whether configured as, or in conjunction with, hardware or a combination of hardware and software, the processor(s) 702 may be capable of performing operations according to various implementations described herein, when configured accordingly. In various embodiments, memory 704 in the UE 102 may include multiple memory devices that can be associated with any common volatile or non-volatile memory type. In some scenarios, the memory 704 may be associated with a non-transitory computer-readable storage medium that can store various computer program instructions, which may be executed by the processor(s) 702 during normal program executions. In this regard, the memory 704 can be configured to store information, data, applications, instructions, or the like, for enabling the UE 102 to carry out various functions in accordance with one or more embodiments of the disclosure. In some implementations, the memory 704 may be in communication with, and/or otherwise coupled to, the processor(s) 702, as well as one or more system buses for passing information between and amongst the different device components of the UE 102.

Representative Embodiments

In some embodiments, a method to obtain information for establishing emergency services sessions via a non-3GPP wireless access network by a wireless device includes: (i) sending to an domain name system (DNS) server a first query for emergency services Public Land Mobile Network (PLMN) information; (ii) receiving from the DNS server a first reply that includes a list of one or more PLMNs that supports emergency services sessions via the non-3GPP wireless access network; (iii) selecting a PLMN from the list of one or more PLMNs; (iv) sending to the DNS server a second query for emergency services evolved Packet Data Gateway (ePDG) information; and (v) receiving from the DNS server a second reply that includes a list of Internet Protocol (IP) addresses for ePDGs that support emergency services sessions via the non-3GPP wireless access network.

In some embodiments, the first query includes an indication that the wireless device is roaming and a unique identifier for a country in which the wireless device is roaming. In some embodiments, each PLMN in the list of one or more PLMNs is associated with the country specified by the unique identifier. In some embodiments, the second query includes an indication of the PLMN selected from the list of PLMNs. In some embodiments, each ePDG identified in the list of IP addresses is associated with the selected PLMN. In some embodiments, the method performed by the wireless device further includes determining a mobile country code (MCC) for a region in which the wireless device operates, where the first query includes an indication of the MCC and the list of one or more PLMNs identifies PLMNs for the MCC indicated in the first query. In some embodiments, when the wireless device is attached to one of the PLMNs listed in the list of one or more PLMNs, the wireless device selects the PLMN to which the wireless device is attached. In some embodiments, when the wireless device is not attached to any of the PLMNs listed in the list of one or more PLMNs and the wireless device is provisioned by a home PLMN (HPLMN) with an ePDG emergency services list that includes at least one PLMN listed in the list of one or more PLMNs, the wireless device selects the PLMN from the list of one or more PLMNs having a highest priority based on the HPLMN provided ePDG emergency services list. In some embodiments, the method performed by the wireless device, while roaming on a visited PLMN, further includes the wireless device: sending, to a DNS server located in a country in which the wireless device is roaming, a third query for emergency services local number information; and receiving, from the DNS server located in the country in which the wireless device is roaming, a third reply that includes a list of emergency services local numbers categorized by emergency services type. In some embodiments, the method performed by the wireless device, while roaming on a visited PLMN, further includes the wireless device: sending, to an ePDG identified in the list of IP addresses for ePDGs that support emergency services sessions via the non-3GPP wireless access network, a query for an IP address of a DNS server located in the country in which the wireless device is roaming; and receiving, from the ePDG identified in the list of IP addresses for ePDGs that support emergency services sessions via the non-3GPP wireless access network, the IP address of the DNS server located in the country in which the wireless device is roaming. In some embodiments, the method performed by the wireless device includes: detecting an attempt to establish an emergency service call; and establishing an emergency services connection based at least in part on the list of IP addresses or the list of emergency services local numbers.

In some embodiments, a wireless device includes wireless circuitry including one or more antennas; processing circuitry including one or more processors communicatively coupled to a memory storing instructions and to the wireless circuitry; and an emergency services support module communicatively coupled to the processing circuitry, where execution of the instructions on the one or more processors causes the wireless device to: (i) send to an domain name system (DNS) server a first query for emergency services Public Land Mobile Network (PLMN) information, the first query including an indication that the wireless device is roaming and a unique identifier for a country in which the wireless device is roaming; (ii) receiving from the DNS server a first reply that includes a list of one or more PLMNs that supports emergency services sessions via the non-3GPP wireless access network, where each PLMN in the list of one or more PLMNs is associated with the country specified by the unique identifier; (iii) selecting a PLMN from the list of one or more PLMNs; (iv) sending to the DNS server a second query for emergency services evolved Packet Data Gateway (ePDG) information, the second query including an indication of the PLMN selected from the list of PLMNs; and (v) receiving from the DNS server a second reply that includes a list of Internet Protocol (IP) addresses for ePDGs that support emergency services sessions via the non-3GPP wireless access network, where each ePDG identified in the list of IP addresses is associated with the selected PLMN.

In some embodiments, execution of the instructions on the one or more processors further causes the wireless device to determine a mobile country code (MCC) for a region in which the wireless device operates; and the unique identifier includes the MCC. In some embodiments, when the wireless device is attached to one of the PLMNs listed in the list of one or more PLMNs, the wireless device selects the PLMN to which the wireless device is attached. In some embodiments, when the wireless device is not attached to any of the PLMNs listed in the list of one or more PLMNs and the wireless device is provisioned by a home PLMN (HPLMN) with an ePDG emergency services list that includes at least one PLMN listed in the list of one or more PLMNs, the wireless device selects the PLMN from the list of one or more PLMNs having a highest priority based on the HPLMN provided ePDG emergency services list. In some embodiments, execution of the instructions on the one or more processors further causes the wireless device to: send, to a DNS server located in the country in which the wireless device is operating, a third query for emergency services local number information; and receive, from the DNS server located in the country in which the wireless device is operating, a third reply that includes a list of emergency services local numbers categorized by emergency services type. In some embodiments, execution of the instructions on the one or more processors further causes the wireless device to: detect an attempt to establish an emergency service call; and establish an emergency services connection based at least in part on the list of IP addresses or the list of emergency services local numbers.

In some embodiments, an apparatus configurable for operation in a wireless device includes one or more processors communicatively coupled to a memory storing instructions that, when executed by the one or more processors, cause the wireless device to: (i) send to an domain name system (DNS) server a first query for emergency services Public Land Mobile Network (PLMN) information, the first query including a unique identifier for a region in which the wireless communication device is operating; (ii) receive from the DNS server a first reply that includes a list of one or more PLMNs that supports emergency services sessions via the non-3GPP wireless access network, each PLMN in the list of one or more PLMNs being associated with the region specified by the unique identifier; (iii) select a PLMN from the list of one or more PLMNs; (iv) send to the DNS server a second query for emergency services evolved Packet Data Gateway (ePDG) information; and (v) receive from the DNS server a second reply that includes a list of Internet Protocol (IP) addresses for ePDGs that support emergency services sessions via the non-3GPP wireless access network.

In some embodiments, the second query includes an indication of the PLMN selected from the list of PLMNs; and each ePDG identified in the list of IP addresses is associated with the selected PLMN. In some embodiments, when the wireless device is not attached to any of the PLMNs listed in the list of one or more PLMNs and the wireless device is provisioned by a home PLMN (HPLMN) with an ePDG emergency services list that includes at least one PLMN listed in the list of one or more PLMNs, the wireless device selects the PLMN from the list of one or more PLMNs having a highest priority based on the HPLMN provided ePDG emergency services list. In some embodiments, execution of the instructions further causes the wireless device to: (vi) send, to a DNS server located in the region in which the wireless device is operating, a third query for emergency services local number information; and (vii) receive, from the DNS server located in the region in which the wireless device is operating, a third reply that includes a list of emergency services local numbers categorized by emergency services type. In some embodiments, execution of the instructions further causes the wireless device to: (viii) detect an attempt to establish an emergency service call; and (ix) establish an emergency services connection based at least in part on the list of IP addresses or the list of emergency services local numbers.

It should be appreciated that not all of the components, device elements, and hardware illustrated in and described with respect to the UE 102 shown in FIG. 7 may be essential to this disclosure, and thus, some of these items may be omitted, consolidated, or otherwise modified within reason. Additionally, in some implementations, the subject matter associated with the UE 102 can be configured to include additional or substitute components, device elements, or hardware, beyond those depicted within the illustration of FIG. 7.

Figure 8:
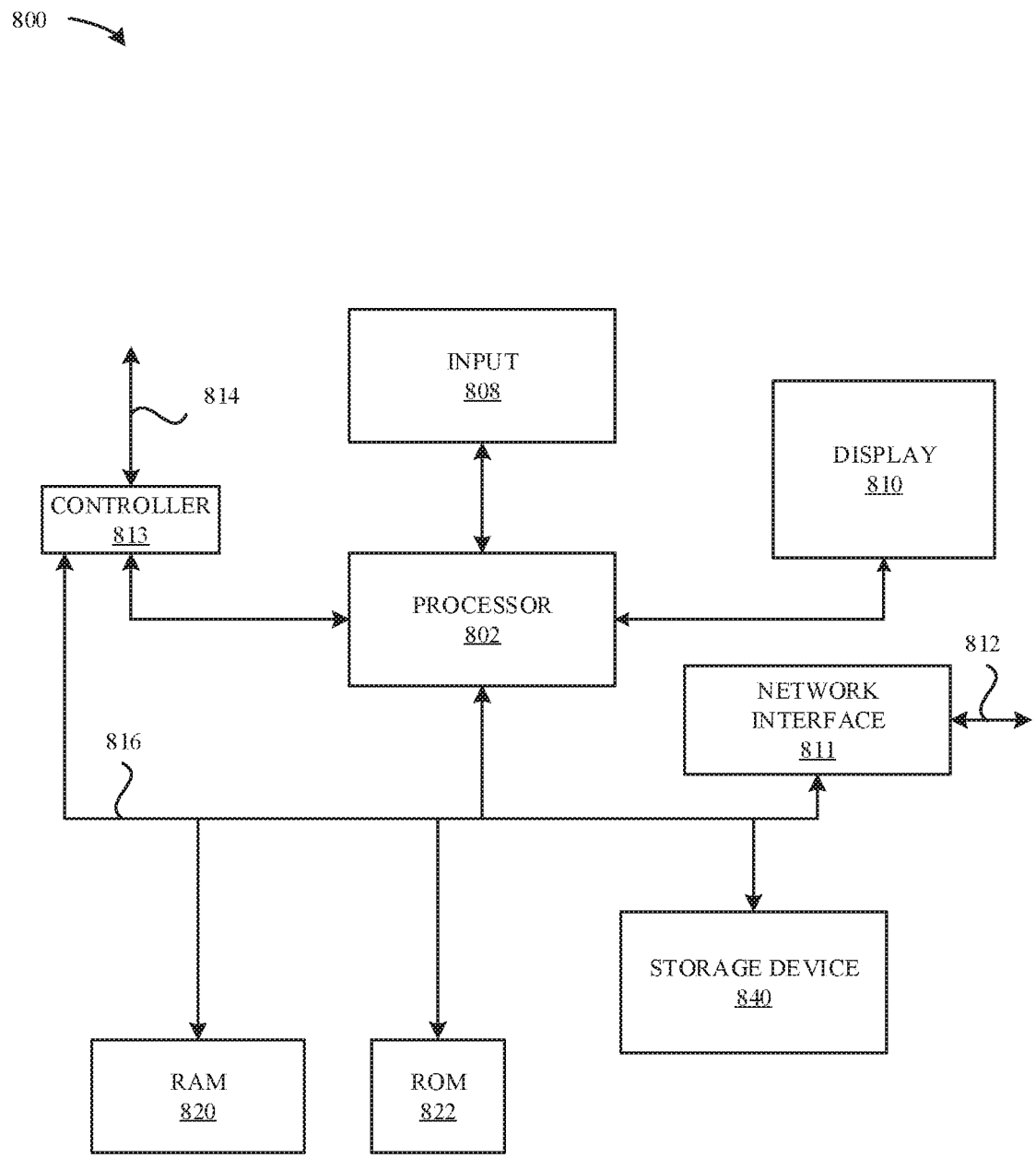
FIG. 8 illustrates in block diagram format an example representative set of elements of a wireless communication device that can be used to implement the various components and techniques described herein, in accordance with some embodiments.

FIG. 8 illustrates a block diagram 800 of an example representative set of elements of a wireless communication device that can be used to implement the various components and techniques described herein. In particular, the detailed view of the exemplary wireless communication device illustrates various components that can be included in the wireless device 102 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user (for example, visual/silent alert notifications and/or information relating to incoming, outgoing, or active communication sessions). A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband processor.

The computing device 800 also includes a storage device 840, which can comprise a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random Access Memory ("RAM") 820 and a Read-Only Memory ("ROM") 822. The ROM 822 can store programs, utilities or processes to be executed in a non-volatile manner. The RAM 820 can provide volatile data storage, and stores instructions related to the operation of the computing device 800.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to establish an emergency services connection, the method comprising:
by a wireless device, while roaming in a visited country or region:
obtaining, from a network-based server that is located in the visited country or region and responsive to a query sent by the wireless device, a list of emergency services local numbers applicable to the visited country or region in which the wireless device is roaming;
selecting a public land mobile network (PLMN) from i) a list of public land mobile networks (PLMNs) obtained from the network-based server or a second network-based server, responsive to a query for PLMNs that support emergency services connections via non-cellular wireless access networks or from ii) a prioritized list of PLMNs provided by a home PLMN of the wireless device; and
responsive to an input indicating an attempt to establish the emergency services connection, establishing the emergency services connection via a non-cellular wireless access network through an emergency services evolved packet data gateway (ePDG) using an emergency services local number included in the list of emergency services local numbers obtained from the network-based server,
wherein the ePDG is applicable to the selected PLMN.

2. The method of claim 1, wherein the list of emergency services local numbers are categorized by emergency services type.

3. The method of claim 1, wherein the wireless device establishes the emergency services connection through the ePDG using an internet protocol (IP) address obtained from the network-based server or the second network-based server in response to a query for emergency services ePDG information.

4. The method of claim 1, further comprising:
by the wireless device:
obtaining, from the network-based server or the second network-based server, responsive to one or more queries, information indicating one or more public land mobile networks (PLMNs) that support emergency services connections via non-cellular wireless access networks in the visited country or region in which the wireless device is roaming.

5. The method of claim 1, further comprising:
by the wireless device:
obtaining, from the network-based server or the second network-based server, responsive to one or more queries, information indicating one or more ePDGs that support emergency services connections via non-cellular wireless access networks in the visited country or region in which the wireless device is roaming.

6. The method of claim 5, wherein at least one query of the one or more queries includes a mobile country code (MCC) value for the visited country or region in which the wireless device is roaming.

7. The method of claim 1, wherein the wireless device selects the PLMN from the list of PLMNs obtained from the network-based server or the second network-based server responsive to the query for PLMNs that support emergency services connections via non-cellular wireless access networks.

8. The method of claim 1, wherein the wireless device selects the PLMN from the prioritized list of PLMNs provided by the home PLMN of the wireless device.

9. A wireless device comprising:
wireless circuitry including one or more antennas;
processing circuitry including one or more processors communicatively coupled to the wireless circuitry and to a memory storing instructions that, when executed by the one or more processors, cause the wireless device, while roaming in a visited country or region, to:
obtain, from a network-based server that is located in the visited country or region and responsive to a query sent by the wireless device, a list of emergency services local numbers applicable to the visited country or region in which the wireless device is roaming;
select a public land mobile network (PLMN) from i) a list of public land mobile networks (PLMNs) obtained from the network-based server or a second network-based server, responsive to a query for PLMNs that support emergency services connections via non-cellular wireless access networks or from ii) a prioritized list of PLMNs provided by a home PLMN of the wireless device; and
responsive to an input indicating an attempt to establish an emergency services connection, establish the emergency services connection via a non-cellular wireless access network through an emergency services evolved packet data gateway (ePDG) using an emergency services local number included in the list of emergency services local numbers obtained from the network-based server,
wherein the ePDG is applicable to the selected PLMN.

10. The wireless device of claim 9, wherein the list of emergency services local numbers are categorized by emergency services type.

11. The wireless device of claim 9, wherein the wireless device establishes the emergency services connection through the ePDG using an internet protocol (IP) address obtained from the network-based server or the second network-based server in response to a query for emergency services ePDG information.

12. The wireless device of claim 9, wherein execution of the instructions further causes the wireless device to:
obtain, from the network-based server or the second network-based server responsive to one or more queries, information indicating one or more public land mobile networks (PLMNs) that support emergency services connections via non-cellular wireless access networks in the visited country or region in which the wireless device is roaming.

13. The wireless device of claim 9, wherein execution of the instructions further causes the wireless device to:
obtain, from the network-based server or the second network-based server responsive to one or more queries, information indicating one or more ePDGs that support emergency services connections via non-cellular wireless access networks in the visited country or region in which the wireless device is roaming.

14. The wireless device of claim 13, wherein at least one query of the one or more queries includes a mobile country code (MCC) value for the visited country or region in which the wireless device is roaming.

15. The wireless device of claim 13, wherein the wireless device selects the PLMN from the list of PLMNs obtained from the network-based server or the second network-based server responsive to the query for PLMNs that support emergency services connections via non-cellular wireless access networks.

16. The wireless device of claim 13, wherein the wireless device selects the PLMN from the prioritized list of PLMNs provided by the home PLMN of the wireless device.

17. An apparatus configurable for operation in a wireless device the apparatus comprising:
one or more processors communicatively coupled to a memory storing instructions that, when executed by the one or more processors, cause the wireless device to, while roaming in a visited country or region:
obtain, from a network-based server that is located in the visited country or region and responsive to a query sent by the wireless device, a list of emergency services local numbers applicable to the visited country or region in which the wireless device is roaming;
select a public land mobile network (PLMN) from i) a list of public land mobile networks (PLMNs) obtained from the network-based server or a second network-based server, responsive to a query for PLMNs that support emergency services connections via non-cellular wireless access networks or from ii) a prioritized list of PLMNs provided by a home PLMN of the wireless device; and
responsive to an input indicating an attempt to establish an emergency services connection, establish the emergency services connection via a non-cellular wireless access network through an emergency services evolved packet data gateway (ePDG) using an emergency services local number included in the list of emergency services local numbers obtained from the network-based server, wherein the ePDG is applicable to the selected PLMN.

18. The apparatus of claim 17, wherein the list of emergency services local numbers are categorized by emergency services type.

19. The apparatus of claim 17, wherein execution of the instructions further causes the wireless device to:
obtain, from the network-based server or the second network-based server responsive to one or more queries, information indicating one or more ePDGs that support emergency services connections via non-cellular wireless access networks in the visited country or region in which the wireless device is roaming.

20. The apparatus of claim 19, wherein:
the wireless device selects the PLMN from the list of PLMNs obtained from the network-based server or the second network-based server responsive to the query for PLMNs that support emergency services connections via non-cellular wireless access networks.

* * * * *